US012664290B2

(12) United States Patent
Avanzi et al.

(10) Patent No.: US 12,664,290 B2
(45) Date of Patent: Jun. 23, 2026

(54) MEMORY PROTECTION

(71) Applicant: Arm Limited, Cambridge (GB)

(72) Inventors: Roberto Avanzi, Munich (DE);
Andreas Lars Sandberg, Cambridge
(GB); Ionut Alexandru Mihalcea,
London (GB); David Helmut Schall,
Bad Reppenau (DE); Alexander
Klimov, Hadera (IL)

(73) Assignee: Arm Limited, Cambridge (GB)

( * ) Notice: Subject to any disclaimer, the term of this
patent is extended or adjusted under 35
U.S.C. 154(b) by 513 days.

(21) Appl. No.: 18/299,216

(22) Filed: Apr. 12, 2023

(65) Prior Publication Data

US 2024/0346155 A1 Oct. 17, 2024

(51) Int. Cl.
 *G06F 21/60* (2013.01)
 *G06F 21/78* (2013.01)
(52) U.S. Cl.
 CPC ............ *G06F 21/602* (2013.01); *G06F 21/78*
(2013.01)
(58) Field of Classification Search
None
See application file for complete search history.

(56) References Cited

U.S. PATENT DOCUMENTS

2016/0275018 A1* 9/2016 Chhabra ................. G06F 21/79
2016/0291891 A1* 10/2016 Cheriton ................. G06F 3/064

2018/0365438 A1* 12/2018 Bhattacharyya ........ G06F 21/64
2019/0251275 A1* 8/2019 Ramrakhyani ..... G06F 21/6218
2021/0058237 A1* 2/2021 Sandberg ................ G06F 21/72

OTHER PUBLICATIONS

Chenyu Yan et al., "Improving Cost, Performance, and Security of
Memory Encryption and Authentication", Proceedings of the Inter-
national Symposium on Computer Architecture (ISCA), 2006, 12
pp.

* cited by examiner

*Primary Examiner* — Philip J Chea
*Assistant Examiner* — Bin Qing Zheng
(74) *Attorney, Agent, or Firm* — NIXON &
VANDERHYE P.C.

(57) ABSTRACT

Apparatuses and methods for memory protection are dis-
closed. A memory protection apparatus is interposed
between a system cache and a memory system. The appa-
ratus comprises encryption circuitry, which encrypts data
item in dependence on encryption metadata and decrypts
encrypted data items in dependence on the encryption meta-
data. In response to a change in a metadata item of the
encryption metadata, when no cached copy of an affected
data item is currently in the system cache, the affected data
item is retrieved from the memory system, re-encrypted
using the updated metadata item and returned to the memory
system. When there is a cached copy, in dependence on
update control data, the copy is retrieved from the system
cache, encrypted using the updated metadata item and
written out to the memory system.

12 Claims, 6 Drawing Sheets

MEMORY PROTECTION

TECHNICAL FIELD

The present disclosure relates to data processing. In particular, the present disclosure relates to memory protection in a data processing system.

DESCRIPTION

A data processing system may be required to handle data which is in need of protection, i.e. should not be accessible to non-trusted external agents. To this end the system may be provided with an apparatus for memory protection which is arranged to encrypt data which is passed to a memory system and to decrypt data which is retrieved from the memory system. A data processing system may also be provided with a system cache which is arranged to store copies of data items retrieved from the memory system, in order to improve access latency times.

SUMMARY

In one example embodiment described herein there is an apparatus for memory protection comprising:
a system cache interface configured to couple the apparatus to a system cache;
a memory system interface configured to couple to apparatus to a memory system;
encryption circuitry configured to encrypt a data item received via the system cache interface in dependence on encryption metadata to produce an encrypted data item for passing via the memory system interface to the memory system and configured to decrypt a received encrypted data item received via the memory system interface in dependence on the encryption metadata to produce a decrypted data item for provision via the system cache interface; and
update control circuitry responsive to a change in a metadata item of the encryption metadata to:
determine at least one affected data item which has been encrypted using the metadata item;
determine whether there is a cached copy of the at least one affected data item currently in the system cache; and
when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and
when there is the cached copy of the at least one affected data item currently in the system cache, in dependence on update control data, to cause the at least one affected data item to be retrieved from the system cache, to be encrypted using the metadata item in post-change form, and to be written out to the memory system.
In one example embodiment described herein there is a data processing system comprising:
a plurality of data processing devices, wherein at least one of the plurality of data processing devices is provided with a private cache;
the apparatus for memory protection of the above-mentioned example embodiment;

the system cache;
and the memory system,
wherein the update control circuitry is responsive to the change in the metadata item of the encryption metadata to determine whether there is a locally cached copy of the at least one affected data item currently in the private cache of at least one of the plurality of data processing devices,
and when there is the locally cached copy of the at least one affected data item to cause the locally cached copy to be brought into the system cache.
In one example embodiment described herein there is a method of memory protection comprising:
receiving a data item from a system cache via a system cache interface;
encrypting the data item in dependence on encryption metadata to produce an encrypted data item;
passing the encrypted data item via a memory system interface to a memory system;
receiving the encrypted data item received via the memory system interface;
decrypting the encrypted data item in dependence on the encryption metadata to produce a decrypted data item for provision via the system cache interface;
responding to a change in a metadata item of the encryption metadata by:
determining at least one affected data item which has been encrypted using the metadata item;
determining whether there is a cached copy of the at least one affected data item currently in the system cache; and
when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and
when there is the cached copy of the at least one affected data item currently in the system cache, in dependence on update control data, to cause the at least one affected data item to be retrieved from the system cache, to be encrypted using the metadata item in post-change form, and to be written out to the memory system.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
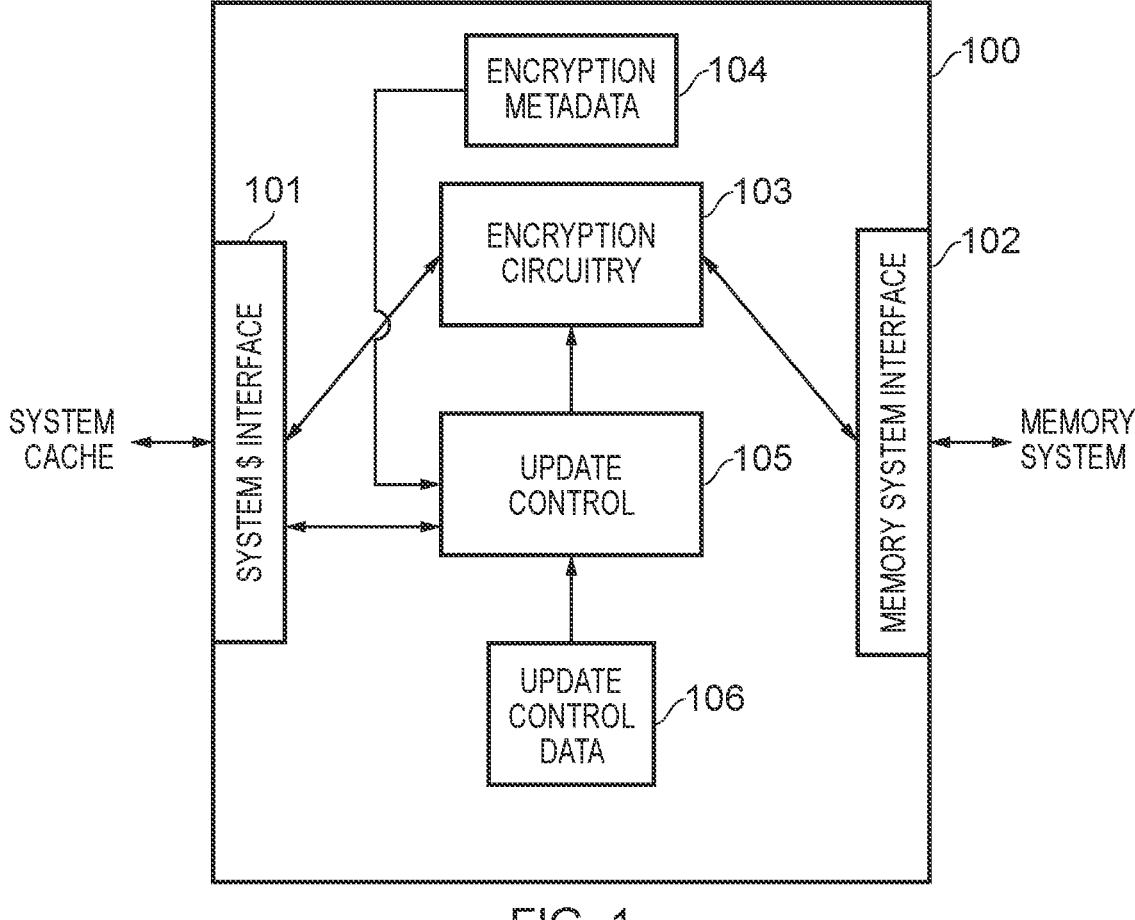
FIG. 1 schematically illustrates an apparatus for memory protection in accordance with some disclosed examples.

Before discussing the embodiments with reference to the accompanying figures, the following description of embodiments is provided.

In accordance with one example configuration there is provided an apparatus for memory protection comprising:

a system cache interface configured to couple the apparatus to a system cache;

a memory system interface configured to couple to apparatus to a memory system;

encryption circuitry configured to encrypt a data item received via the system cache interface in dependence on encryption metadata to produce an encrypted data item for passing via the memory system interface to the memory system and configured to decrypt a received encrypted data item received via the memory system interface in dependence on the encryption metadata to produce a decrypted data item for provision via the system cache interface; and update control circuitry responsive to a change in a metadata item of the encryption metadata to:

determine at least one affected data item which has been encrypted using the metadata item;

determine whether there is a cached copy of the at least one affected data item currently in the system cache; and when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and when there is the cached copy of the at least one affected data item currently in the system cache, in dependence on update control data, to cause the at least one affected data item to be retrieved from the system cache, to be encrypted using the metadata item in post-change form, and to be written out to the memory system.

The encryption performed by the encryption circuitry is performed in dependence on encryption metadata, such that when a metadata item of the encryption metadata changes, this changes the encryption of any data item which is encrypted using that a metadata item. Moreover, the change in the metadata item of the encryption metadata means that any data item which has been encrypted using that pre-change value of the metadata item cannot be decrypted with the post-change value of the metadata item. Hence, for a data item which is stored in the memory system, protected by its encryption using the pre-change value of the metadata item of the encryption metadata, when the metadata item is updated, this requires the encrypted data item to be retrieved from the memory system, decrypted using the pre-change value of the metadata item, re-encrypted with the post-change value of the metadata item, and returned for storage in the memory system. The present techniques however further recognise that in a data processing system which comprises a system cache, the presence or absence of a data item in the system cache may influence how such a change in a metadata item of the encryption metadata is handled with respect to a data item which has been encrypted using that metadata item. Firstly, when a data item which is affected by a change in a metadata item of the encryption metadata is not present in the system cache, then the apparatus has no choice but (sooner or later) to cause an encrypted version of the affected data item to be retrieved from the memory system, to decrypt it using the metadata item in pre-change form, to re-encrypt it using the metadata item in post-change form, and return it to the memory system. It should be noted that this process of decryption and re-encryption may also be somewhat compressed into a transformation that does not explicitly decrypt and then encrypt the data item, but rather combines this effectively into a single step. For example, there are cases (particularly when using counter-mode encryption) where a "transformation" block can be calculated, which is XOR'd with the ciphertext to transform it from being encrypted with the old metadata to the new metadata. In this case, the transformation block is the XOR of the one-time pad generated using the old metadata and the one-time pad generated using the new metadata. Effectively, it just changes the evaluation order of 2 XOR operations. Alternatively, when the data item which is affected by a change in metadata item of the encryption metadata is present in the system cache, the present techniques recognise that there are various ways in which this could be handled.

One approach would be for the apparatus to cause the cached copy of the at least one affected data item to be marked as modified in the system cache. In this way, at some point in the future, when the data item is evicted from the system cache, the data item will be handled as though it has been modified (whether or not it in fact has been modified) and will thus be written back to the memory system. In doing so it will be re-encrypted by the apparatus for memory protection using the updated metadata item of the encryption metadata (which may even have been further updated in the meantime). The present techniques however recognise that this is not the only approach which may be taken when the affected data item is present in the system cache. In particular, it is proposed that the cached copy may be retrieved from the system cache, encrypted using the metadata item in post-change form, and written out to the memory system. In other words, the affected data item may be encrypted and written back to memory anyway, despite being present in the system cache. This action is taken in dependence on update control data, which gives a useful degree of configurability to the apparatus for its user. In some examples the update control data may simply indicate that the affected data item should always be encrypted and written back to memory anyway, despite being present in the system cache. In other examples, the update control data may vary in dependence on other factors (as will be described in more detail below), so that that the affected data item is not always encrypted and written back to memory anyway, when it is found to be present in the system cache. Naively, for the apparatus to operate by retrieving the affected data item from the system cache, encrypting it, and causing it to be written back to memory anyway, despite being present in the system cache, could seem to incur unnecessary effort (since the mechanism of merely marking the (cache line containing the) affected data item as modified in the system cache is available). However, it has surprisingly been found that in some circumstances the write-back to memory does not incur significant additional cost. Generally, this can be understood as being due to the fact that the cost of write strides to adjacent memory locations is quite low compared to the cost of randomly scattered writes. Cache content is typically handled in units of cache lines (i.e. a cache line is the data unit which is filled/evicted), which may for example be 64 bytes, whereas RAM row sizes may for example be 1 kB or 2 kB, i.e. 16 or 32 times larger. Accordingly, a sequence of cache lines which correspond to a contiguous memory block may be efficiently written if they fit within the same memory row (i.e. the incremental cost of writing an additional cache line to a given memory row is low, if that memory row is already being opened for another cache line write).

In some examples the update control circuitry is responsive to the change in the metadata item of the encryption metadata, when there is the cached copy of the at least one affected data item currently in the system cache, when the update control data has a first value, to cause the cached copy of the at least one affected data item to be retrieved from the system cache, to be encrypted using the metadata item in post-change form, and to be written out to the memory system, and when the update control data has a second value, to cause the cached copy of the at least one affected data item to be marked as modified in the system cache.

The setting of the value of the update control data thus allows the manner in which the apparatus handles an affected data item to be controlled, when there is a change in the metadata item of the encryption metadata which is used to encrypt that affected data item.

The update control data may have a value which is statically set in some examples and which is dynamic in other examples. Hence in some examples the update control circuitry is configured to maintain the update control data in a dynamic manner, wherein the update control data takes the first value or the second value in dependence on at least one dynamic factor when the apparatus is in operation.

The dynamic factor or factors which determine the value of the update control data could take a variety of forms. In some examples the at least one dynamic factor comprises an indication of a master device accessing the at least one affected data item. Thus the handling of a cached affected data item may depend on the master device which is accessing the at least one affected data item.

In some examples the at least one dynamic factor comprises a category of data to which the at least one affected data item has been assigned. For example, some data categories may commonly be accessed in sequential manner (enhancing the cost benefit of a write back as explained above) and some data categories may commonly be accessed in a more randomised manner (meaning that write-back may be proportionally costlier).

A more empirical approach to setting the value of the update control data may be taken, and in some examples the at least one dynamic factor comprises a data access pattern indicator, wherein the data access pattern indicator has been empirically determined from previous data access patterns.

As mentioned above, the value of the update control data may be statically set to cause a certain behaviour, and thus in some examples the update control data is set to cause the at least one affected data item to be retrieved from the system cache, to be encrypted using the metadata item in post-change form, and to be written out to the memory system.

The encryption metadata may take a variety of forms and hence the change in the metadata item of the encryption metadata may also take a variety of forms, but in some examples the encryption circuitry comprises counter circuitry configured to maintain at least one count value, wherein the encryption metadata comprises the at least one count value, and wherein the encryption circuitry is configured to encrypt the data item received via the system cache interface in dependence on the at least one count value and to decrypt the received encrypted data item received via the memory system interface in dependence on the at least one count value, and wherein the change in the metadata item of the encryption metadata comprises an incrementing of the at least one count value by the counter circuitry configured.

In some examples the apparatus further comprises data integrity checking circuitry configured to generate an integrity value for the data item received via the system cache interface and to cause the integrity value to be stored in association with the encrypted data item in the memory system, and configured to regenerate the integrity value in dependence on the received encrypted data item and to compare the regenerated integrity value with the integrity value stored in association with the encrypted data item to verify the integrity of the received encrypted data item.

In accordance with one example configuration there is provided a data processing system comprising:

a plurality of data processing devices, wherein at least one of the plurality of data processing devices is provided with a private cache;

the apparatus for memory protection in any of the configurations described above;

the system cache;

and the memory system, wherein the update control circuitry is responsive to the change in the metadata item of the encryption metadata to determine whether there is a locally cached copy of the at least one affected data item currently in the private cache of at least one of the plurality of data processing devices, and when there is the locally cached copy of the at least one affected data item to cause the locally cached copy to be brought into the system cache.

In accordance with one example configuration there is provided a method of memory protection comprising:

receiving a data item from a system cache via a system cache interface;

encrypting the data item in dependence on encryption metadata to produce an encrypted data item;

passing the encrypted data item via a memory system interface to a memory system;

receiving the encrypted data item received via the memory system interface;

decrypting the encrypted data item in dependence on the encryption metadata to produce a decrypted data item for provision via the system cache interface;

responding to a change in a metadata item of the encryption metadata by:

determining at least one affected data item which has been encrypted using the metadata item;

determining whether there is a cached copy of the at least one affected data item currently in the system cache; and when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and when there is the cached copy of the at least one affected data item currently in the system cache, in dependence on update control data, to cause the at least one affected data item to be retrieved from the system cache, to be encrypted using the metadata item in post-change form, and to be written out to the memory system.

Particular embodiments will now be described with reference to the figures.

FIG. 1 illustrates an apparatus 100 in accordance with one embodiment. The apparatus is provided for the purpose of memory protection, i.e. to protect data which is passed to a memory system for storage. Thus the apparatus 100 is to be viewed as a trusted device, whist the memory system is to be viewed as potentially vulnerable to access by non-trusted third parties. The apparatus is shown to comprise a system cache interface 101 via which the apparatus exchanges data with a system cache (not explicitly shown) and a memory system interface 102 via which the apparatus exchanges data with a memory system (not explicitly shown), where it will be understood that together the apparatus 100, the system cache, and the memory system form components of the wider data processing system. The apparatus 100 is provided with encryption circuitry 103, which enables the apparatus to encrypt plaintext data received via the system cache interface 101 for passing via the memory system interface 102 to the memory system for storage. Conversely, the encryption circuitry 103 also enables the apparatus to decrypt ciphertext data received via the memory system interface 102 for passing via the system cache interface 101 to the system cache. The encryption circuitry 103 performs the encryption/decryption using encryption metadata 104. In order to further support the encryption security provided by the apparatus, the encryption metadata 104 are not static. A change in a metadata item of the encryption metadata means that the security of any data items which have been encrypted using the metadata item is increased, since the encryption of such data items changes with the change of the metadata item. Such a change does however necessitate that any relevant data item or data items in the memory system whose encryption is affected by the change in the encryption metadata item must be decrypted using the pre-change value of the metadata item and re-encrypted using the post-change value of the metadata item. Moreover, it is recognised here that some such data items may happen currently to be cached in the system cache. For this reason, the apparatus 100 is further provided with update control circuitry 105, which is responsive to a change in a metadata item of the encryption metadata to determine which data items are affected by the change, i.e. have been encrypted using the metadata item. For the data items thus determined, the update control circuitry 105 further communicates (via the system cache interface 101) with the system cache to determine whether there is currently a cached copy of the affected data item(s) in the system cache. If an affected data item is not currently cached in the system cache, then the update circuitry 105 causes the data item (in encrypted form) to be retrieved from the memory system. It is then decrypted by the encryption circuitry 103 using the metadata item in pre-change form and re-encrypted using the metadata item in post-change form, before being returned to the memory system. Conversely, when there currently is a copy of an affected data item cached in the system cache, then the update circuitry 105 handles it in one of two ways, depending on current value of the update control data 106.

In particular, the value of the update control data can cause the cached copy to be retrieved from the system cache, encrypted using the metadata item in post-change form, and written out to the memory system. Thus, although the affected data item is present in the system cache (and thus its encryption update could in principle be deferred until it is evicted from the system cache), nonetheless it is proactively gathered from the system cache, encrypted using the new value of the metadata item, and written out to the memory system. As mentioned above, although this approach could seem to incur unnecessary effort (since the mechanism of merely marking the (cache line containing the) affected data item as modified in the system cache is available), it has surprisingly been found that in some circumstances the write-back to memory does not incur significant additional cost, for example because a sequence of cache lines which correspond to a contiguous memory block may be efficiently written if they fit within the same memory row (i.e. the incremental cost of writing an additional cache line to a given memory row is low, if that memory row is already being opened for another cache line write). Note also that the copy of the data item in the system cache can then also be marked as clean (if dirty), which potentially avoids a further writeback and metadata update.

Figure 2:
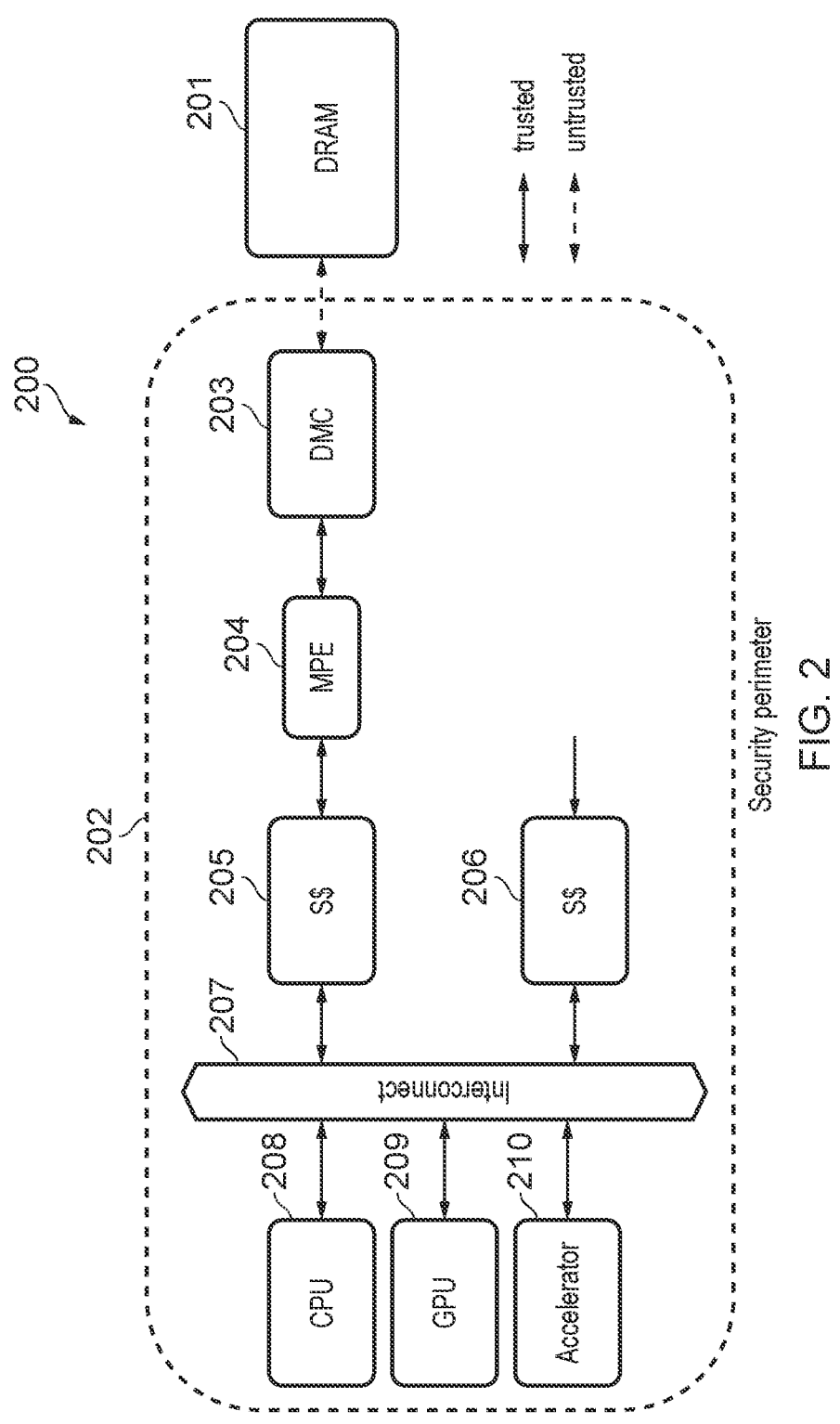
FIG. 2 schematically illustrates a data processing system comprising an apparatus for memory protection in accordance with some disclosed examples.

FIG. 2 schematically illustrates the configuration of a data processing system 200 according some configurations of the present techniques. The data processing system 200 may for example be embodied as a system-on-chip device, where all of the illustrated components other than the DRAM 201 are integrated onto a chip, whilst the DRAM 201 is "off-chip". As such the boundary of the chip may conceptually be considered to represent a security perimeter 202, whereby data within the security perimeter 202 is within safe, trusted environment, and communications which pass off-chip to the DRAM 201 are non-trusted and may be vulnerable to inspection or even tampering with by non-trusted third parties. In the example of FIG. 2 the secure region within the security perimeter 202 comprises dynamic memory controller 203 (DMC), a memory protection engine 204 (MPE) (which may for example be configured as shown in FIG. 1) system caches 205, 206 (which are secure storage located in the secure region 202), an interconnect 207, and master devices including CPU 208, GPU 209, and accelerator 210. Data items are transferred between the DRAM 201 and the system cache 205 via the memory controller 203 and the memory protection engine 204. The data items are transferred when requested by one of the master devices and may be cached in one or more higher levels of cache associated with the CPU 208, the GPU 209, or the accelerator 210. Data that is stored within the secure region 202 does not need to be protected via an encryption process. On the other hand, data that is stored outside of the secure region 202, for example, in the DRAM 201 should be protected using an encryption process. In fact in some examples the transition from "trusted" to "non-trusted" can be considered to fall after the MPE 204 and before the DMC 203, such that the DMC 203 is outside the secure region, since it is not necessary for the DMC 203 to be trusted, with the security of the secure region being enforced by the MPE 204.

Figure 3:
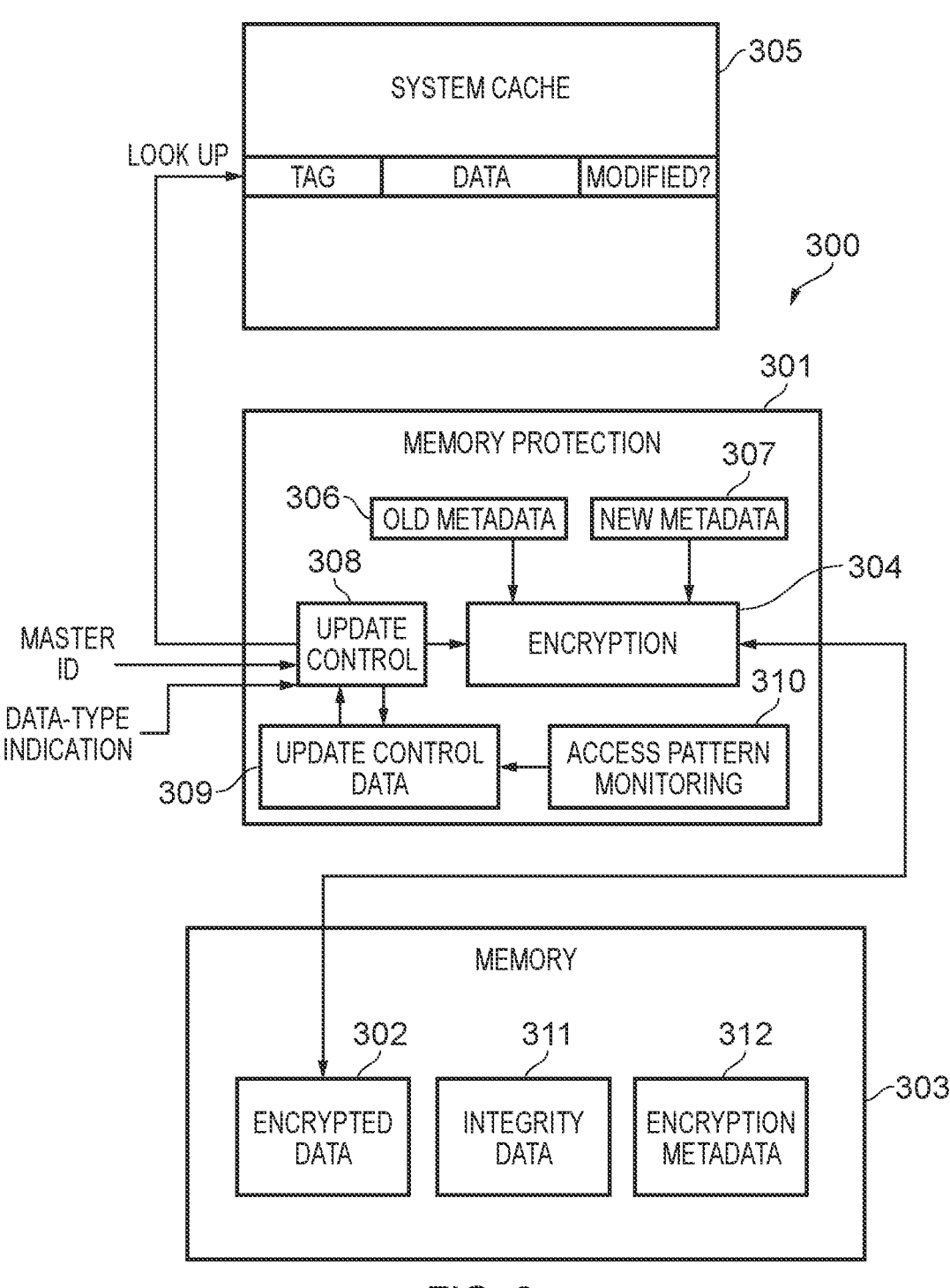
FIG. 3 schematically illustrates a data processing system comprising an apparatus for memory protection in accordance with some disclosed examples.

FIG. 3 schematically illustrates a data processing system 300 comprising an apparatus 301 for memory protection in accordance with some disclosed examples. In accordance with the other examples described herein, the apparatus 301 is arranged to provide protection to data values which are handled by the data processing system 300, where those data values are stored in an encrypted form 302 in a memory 303. Data items retrieved from the memory 303 in encrypted form are decrypted by encryption circuitry 304 before being passed via (and cached in) the system cache 305 to the data processing agent which requested that data. The encryption is performed with reference to encryption metadata, which is not static, but rather at least some metadata items of the encryption metadata are updated as the data processing system operates. For example, the encryption metadata may comprise counter values, where a counter value may be updated periodically or in response to certain events, such as access in the memory system to a data item encrypted with reference to that encryption metadata. In many implementations at least some of the encryption metadata is stored in the off-chip memory 303. Such memory-stored encryption metadata 312 may itself be protected by an integrity tree which ultimately leads back to an on-chip root value. In cases where integrity guarantees are provided, integrity data 311 and encryption metadata 312 would effectively end up in the same data structure.

For an encrypted data item stored in the memory 303 for which encryption metadata has been modified, this will in principle require the encrypted data item to be retrieved, decrypted using the pre-change form 306 of the encryption metadata, re-encrypted using the post-change form 307 of the encryption metadata, and written back to the memory 303. However, the memory protection apparatus 301 is further provided with update control circuitry 308, which monitors for updates to the encryption metadata. When there is a change in a metadata item of the encryption metadata, the update control circuitry 308 determines which data items are affected by the change, i.e. have been encrypted using the metadata item. For a data item thus affected, the update control circuitry 308 causes a lookup to be performed in the system cache 305, to determine if there is currently a cached copy of the affected data item in the system cache. When it is not, then the update circuitry 308 causes the data item (in encrypted form) to be retrieved from the memory system, decrypted by the encryption circuitry 304 using the metadata item in pre-change form 306 and re-encrypted using the metadata item in post-change form 307, before being returned to the memory system. Conversely, when there currently is a copy of an affected data item cached in the system cache, then the update circuitry 308 handles it in one of two ways, depending on current value of the update control data 309. A first value of the update control data 309 causes the cached copy to be retrieved from the system cache, encrypted using the metadata item in post-change form 307, and written out to the memory system. Thus, although the affected data item is present in the system cache (and thus its encryption update could in principle be deferred until it is evicted from the system cache), nonetheless it is proactively gathered from the system cache, encrypted using the new value of the metadata item, and written out to the memory system. A second value of the update control data 309 causes the update control data to cause the cache line comprising the affected data to be marked as modified in the system cache 305. The value of the update control data 309 may be statically set, such that it does not change throughout the operation of the data processing system 300. However, it may also be dynamically maintained, such that the manner in which such affected data items cached in the system cache 305 are handled when their encryption metadata is updated can vary in dependence on the circumstances. In one example the update control data is modified (by the update control circuitry 308) in dependence on the master device which is accessing the affected data item. Thus differing behaviour may be provided on a master-by-master basis. In one example, the update control data is modified (by the update control circuitry 308) in dependence on the type of data to which the affected data item belongs. Thus differing behaviour may be provided as appropriate to the data type. The data type may be variously defined, but to take just one example some graphics data may be accessed and stored in a highly sequential fashion, meaning that the above-mentioned unexpectedly low cost of re-encrypting and writing back a cached data item to the memory may be more pronounced. Other data types may be known to be accessed in a more randomised manner and such write-backs might then be avoided. Further, the apparatus 301 may also be provided with access pattern monitoring circuitry 310, which is arranged to monitor data access patterns of the data items handled by the apparatus 301. When the access pattern is sufficiently regular, especially sequential, the update control data can be modified to have the first value, whereas when the access pattern is insufficiently regular, the update control data can be modified to have the second value.

In addition to encrypting the data item itself, the memory protection apparatus 301 may also generate integrity data associated with the data being protected, where the integrity data 311 is also stored in the memory 303, such that modification of the protected data (or of its associated integrity data) can be identified. In some examples a data integrity tree may be used to protect data items in a sequence of memory blocks, when those memory blocks are stored in off-chip storage. An example data integrity tree may for example make use of a hash value generated for each of the memory blocks at the time of storage. When the data is read, the corresponding hash can also be read and compared against a newly generated version of the hash which is based on the data being read. In this way it can be determined if either the hash or the memory block has been modified during storage. Using such an approach can provide some assurance that the data in the memory blocks has not been modified. However, there is no guarantee from this data alone, that there has not been a modification to both the data in the memory block and the corresponding hash. Therefore, as a next level of the data integrity tree, a number of higher level hashes are formed based on the combination of the hashes generated from the data blocks. Still further levels of higher level hashes can be added, each based on combinations of hashes from the next level lower. Each level can be used to verify the integrity of the level below it. Ultimately a single top level hash is generated based on penultimate level of multiple hashes. The top hash can be recomputed at the time at which the data is read and can be compared against a stored value of the top hash to verify the integrity of the penultimate level hashes. In order to ensure that the top level hash is also not modified, the top hash is stored in secure storage. All other hash values may be stored in non-secure storage along with the protected data. In this way it is possible to validate the integrity of data items stored in the memory blocks. Other known integrity guarantees may of course be used.

Figure 4:
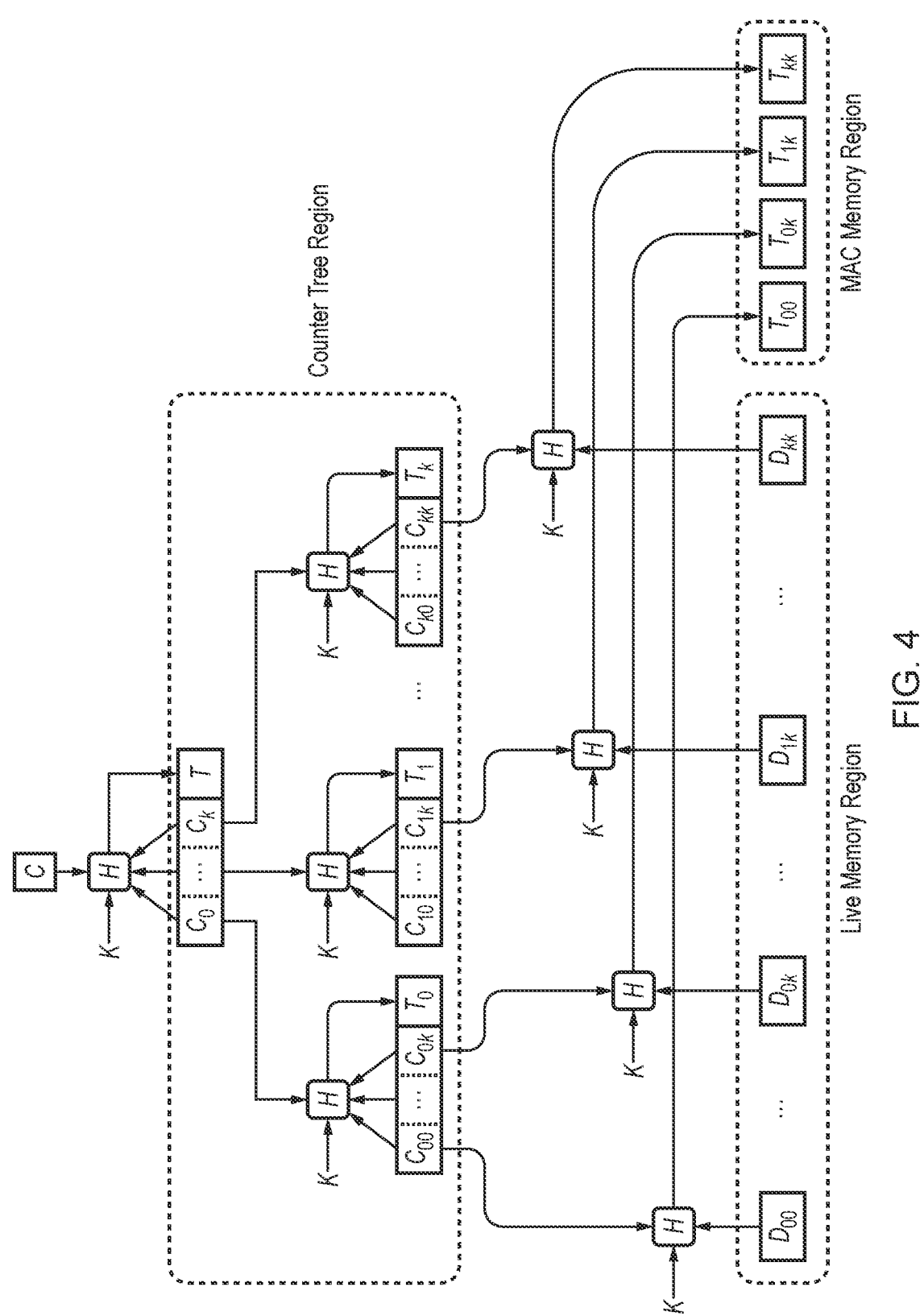
FIG. 4 schematically illustrates a counter tree methodology used for the enhancement of data encryption and to facilitate data integrity verification in accordance with some disclosed examples.

FIG. 4 schematically illustrates an integrity tree for verifying the integrity of stored data which makes use of counter values (where the counter values are encryption metadata). Rather than storing a tree of hash values that are generated from data items of from hash values that are stored further from the root of the integrity tree, the integrity tree stores sets of counters. The counters (denoted c in the figure) at each level are stored in association with a MAC (message authentication code) (denoted T in FIG. 3). The MAC is generated from the associated counters and a higher level counter. Starting at the top of the tree, a single top level counter C is stored in secure storage. A top level node of the counter tree region of the integrity tree comprises a plurality of counters $c_0 \ldots c_k$ which are each associated with a next level of the counter tree region. The top level node of the counter tree also stores a MAC T which is generated from a hash of the counters $c_0 \ldots c_k$, the top level counter C, and a secret key K. In this way, the counters $c_0 \ldots c_k$ of the top level node can be validated by regenerating the MAC T and comparing it against the stored T. If any of the counters $c_0 \ldots c_k$ have changed, or if the MAC T has changed then the comparison will fail. At a next level of the counter tree region of the integrity tree, each node comprises a plurality of next level counters $c_{00} \ldots c_{kk}$ where counters $c_{i0} \ldots c_{ik}$ are associated with counter $c_i$ of the top level node of the integrity tree. Each node (i) at the next level of the counter tree region of the data integrity tree also comprises a MAC Ti for i in the range $0 \ldots k$ which is generated from a hash of the counters $c_{i0} \ldots c_{ik}$ combined with the counter $c_i$ from the top level node and the secret key K. In this way, the counters $c_{i0} \ldots c_{ik}$ of node i can be validated by regenerating the MAC $T_i$ and comparing it against the stored $T_i$. If any of the counters $c_{i0} \ldots c_{ik}$, the MAC $T_i$ or the counter $c_i$ of the top level node has changed, the comparison will fail. Each counter of the next level of the counter tree region is associated with data $D_{ij}$ for i in the range $0 \ldots k$ and j in the range $0 \ldots k$ and a corresponding MAC $T_{ij}$. Each MAC $T_{ij}$ is generated from a hash of the data $D_{ij}$ in combination with the counter $c_{ij}$ and the secret key. In this way, the data $D_{ij}$ can be validated by regenerating the MAC $T_{ij}$ and comparing it against the stored $T_{ij}$. An integrity tree comprising a counter tree region can be made robust to replay attacks by incrementing (or otherwise modifying) counters before the data items are written. Modification of a counter, for example, counter $c_{10}$ would require the MACs $T_{10}$, and $T_i$ to be recomputed. Modification of a counter of the upper level node, for example, $c_0$, would require the MACS T and $T_0$ to be recomputed. It should be noted that the height of the tree (i.e. the number of "layers" of counters) is arbitrary and could vary from that shown in the specific example of FIG. 4.

Figure 5:
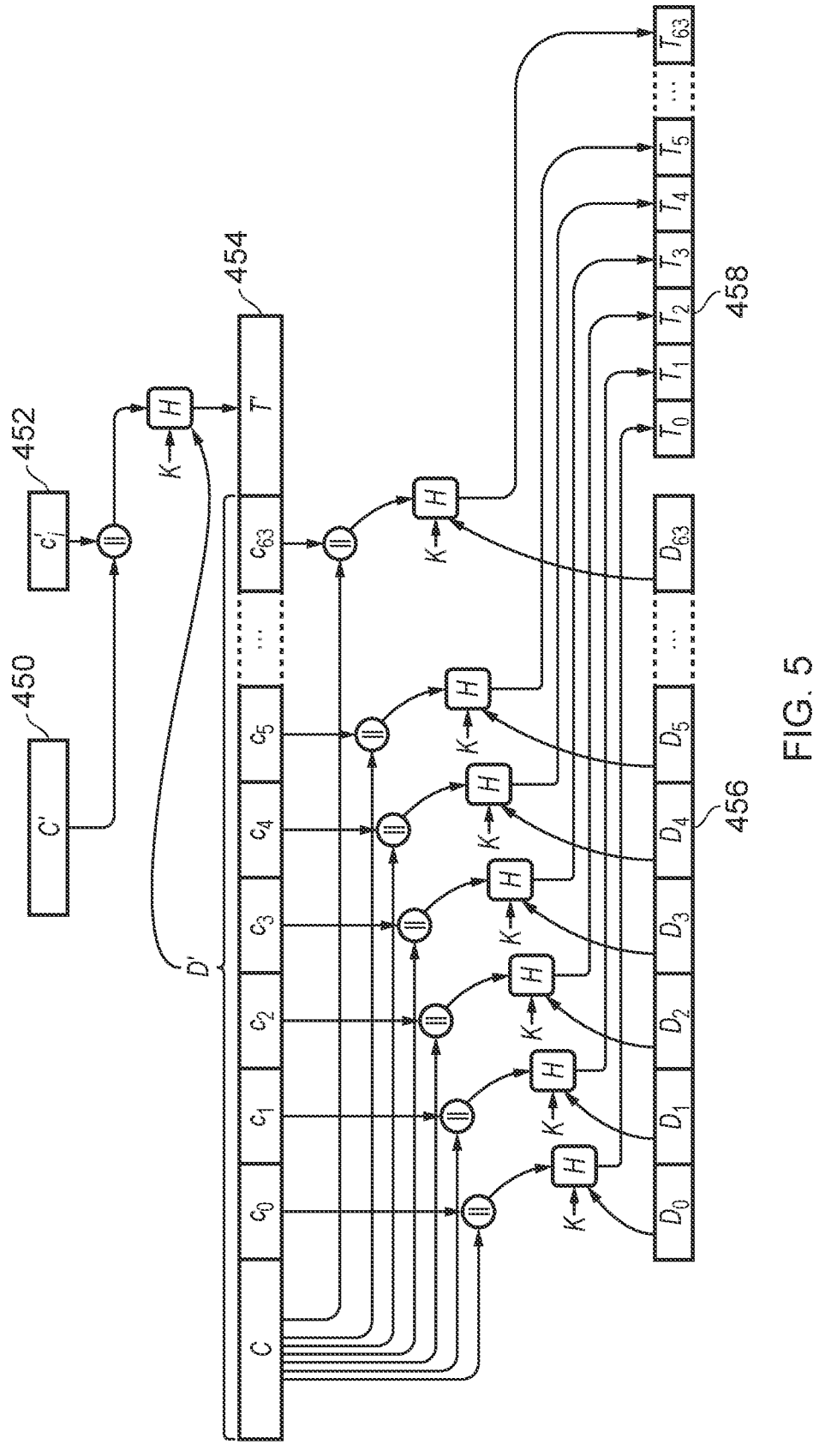
FIG. 5 schematically illustrates the use of major and minor counters in the implementation of a counter tree methodology in accordance with some disclosed examples.

FIG. 5 schematically illustrates the use of a plurality of levels of counter within a single node of a counter tree. In the illustrated configuration the node of the counter tree 454 comprises a plurality of counters including a single major counter C and 64 minor counters $c_j$ for j in the range 0 to 63. Each of the 64 minor counters is associated with corresponding data $D_j$ 456 and a corresponding MAC $T_j$ 458 generated as a hash of the data $D_j$ combined with minor counter $c_j$, major counter C, and the secret key K. The provision of the counters as a set of minor counters combined with a single major counter enables the provision of a greater number of counters for the same number of bits within a node of the integrity tree. Integrity of the data $D_j$ 456 can be determined on reading by re-computing the MAC $T_j$ and comparing it against the stored MAC $T_j$ 458. The counters C and $c_j$ are associated with a MAC T' which is calculated based on a hash of the counters C and $c_j$ in combination with the secret key K and the major and minor counters C' 450 and $c'_i$ 452 from a next level node closer to the root of the integrity tree. As in the case of FIG. 4, when data $D_j$ 456 is written to the off-chip storage the associated minor counter $c_j$ is modified to mitigate against replay attacks. When the counter $c_j$ is modified, the MAC $T_j$ must be recomputed for consistency with the minor counter $c_j$. In addition, the MAC T' must be recomputed for consistency with the minor counter $c_j$. In the event that the minor counter $c_j$ overflows, the major counter C is incremented. When C is incremented each of the MACs $T_0 \ldots T_{63}$ must be recomputed for consistency with the modified major counter. In addition, the MAC T' must be recomputed for consistency with the major counter C. Thus, a greater number of data items can be associated with a single node of the counter tree in this way. However, when a data item is modified a sufficient amount of times that the minor counter associated with that data item is modified, then the counter overflows and, as a result, the MACs associated with each data item that is associated with the minor counter must be recomputed. In the present context the counters may be considered examples of encryption metadata.

Figure 6:
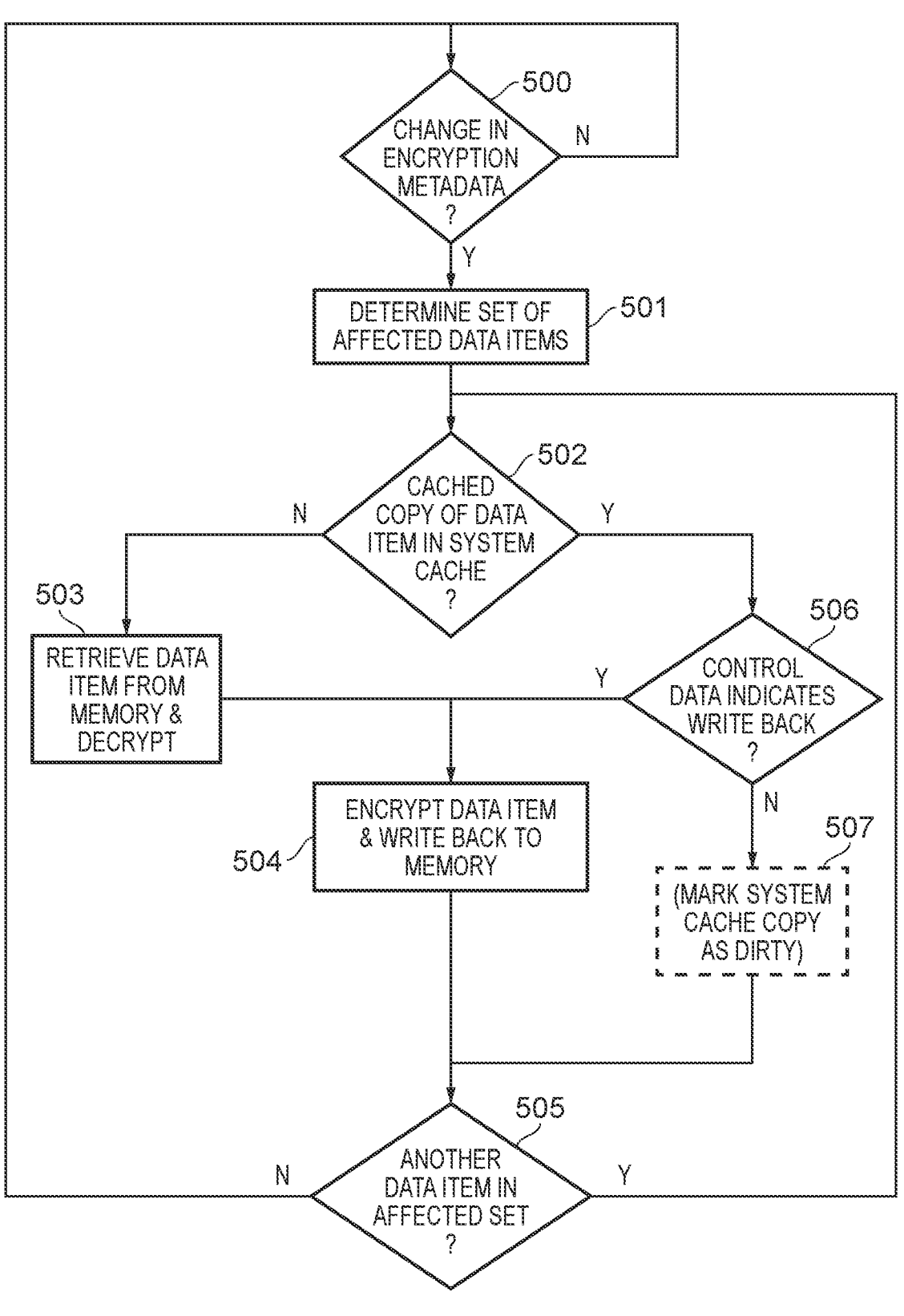
FIG. 6 is a flow diagram showing a sequence of steps which are taken when carrying out a method in accordance with some disclosed examples.

FIG. 6 shows a sequence of steps which may be carried out when implementing the method of some examples. The flow can be considered to begin at step 500, where it is determined if there has been a change in encryption meta data. Until this is the case the flow loops upon itself at this step. When such a change is detected the flow proceeds to step 501 where an affected set of data items is determined. Then at step 502 it is determined if there is a cached copy of an affected data item in the system cache. If there is not, then the flow proceeds to step 503 where the affected data item is retrieved from the memory and decrypted (with the old value of the metadata) and following this at step 504 the data item is re-encrypted (with the updated metadata) and written back to memory. At step 505 it is determined if there is another data item in the affected set, and when this is the case the flow returns to step 502 that next data item to be looked up in the system cache. When the set is complete the flow returns to step 500. Returning to a consideration of step 502 when there is a cached copy of an affected data item in the system cache, then the flow proceeds to step 506 where control data determines whether a write back should occur. If the write back should occur, then the flow proceeds via step 504. However, if the control data indicates that the write back should not occur, then step 504 is omitted. Optionally step 507 may be taken (and typically will be) to mark the system cache copy as dirty i.e. modified, such that it will be written back to memory when evicted from the cache.

Various configurations disclosed herein are summarised in the following numbered clauses:

Clause 1. An apparatus for memory protection comprising:

a system cache interface configured to couple the apparatus to a system cache;

a memory system interface configured to couple to apparatus to a memory system;

encryption circuitry configured to encrypt a data item received via the system cache interface in dependence on encryption metadata to produce an encrypted data item for passing via the memory system interface to the memory system and configured to decrypt a received encrypted data item received via the memory system interface in dependence on the encryption metadata to produce a decrypted data item for provision via the system cache interface; and update control circuitry responsive to a change in a metadata item of the encryption metadata to:

determine at least one affected data item which has been encrypted using the metadata item;

determine whether there is a cached copy of the at least one affected data item currently in the system cache; and when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and when there is the cached copy of the at least one affected data item currently in the system cache, in dependence on update control data, to cause the at least one affected data item to be retrieved from the system cache, to be encrypted using the metadata item in post-change form, and to be written out to the memory system.

Clause 2. The apparatus as defined in Clause 1, wherein the update control circuitry is responsive to the change in the metadata item of the encryption metadata, when there is the cached copy of the at least one affected data item currently in the system cache, when the update control data has a first value, to cause the cached copy of the at least one affected data item to be retrieved from the system cache, to be encrypted using the metadata item in post-change form, and to be written out to the memory system, and when the update control data has a second value, to cause the cached copy of the at least one affected data item to be marked as modified in the system cache.

Clause 3. The apparatus as defined in Clause 2, wherein the update control circuitry is configured to maintain the update control data in a dynamic manner, wherein the update control data takes the first value or the second value in dependence on at least one dynamic factor when the apparatus is in operation.

Clause 4. The apparatus as defined in Clause 3, wherein the at least one dynamic factor comprises an indication of a master device accessing the at least one affected data item.

Clause 5. The apparatus as defined in Clause 3 or Clause 4, wherein the at least one dynamic factor comprises a category of data to which the at least one affected data item has been assigned.

Clause 6. The apparatus as defined in any of Clauses 3-5, wherein the at least one dynamic factor comprises a data access pattern indicator, wherein the data access pattern indicator has been empirically determined from previous data access patterns.

Clause 7. The apparatus as defined in Clause 1, wherein the update control data is set to cause the at least one affected data item to be retrieved from the system cache, to be encrypted using the metadata item in post-change form, and to be written out to the memory system.

Clause 8. The apparatus as defined in any of Clauses 1-7, wherein the encryption circuitry comprises counter circuitry configured to maintain at least one count value, wherein the encryption metadata comprises the at least one count value, and wherein the encryption circuitry is configured to encrypt the data item received via the system cache interface in dependence on the at least one count value and to decrypt the received encrypted data item received via the memory system interface in dependence on the at least one count value, and wherein the change in the metadata item of the encryption metadata comprises an incrementing of the at least one count value by the counter circuitry configured.

Clause 9. The apparatus as defined in any of Clauses 1-8, further comprising data integrity checking circuitry configured to generate an integrity value for the data item received via the system cache interface and to cause the integrity value to be stored in association with the encrypted data item in the memory system, and configured to regenerate the integrity value in dependence on the received encrypted data item and to compare the regenerated integrity value with the integrity value stored in association with the encrypted data item to verify the integrity of the received encrypted data item.

Clause 10. A data processing system comprising:

a plurality of data processing devices, wherein at least one of the plurality of data processing devices is provided with a private cache;

the apparatus for memory protection as defined in any of Clauses 1-9;

the system cache;

and the memory system, wherein the update control circuitry is responsive to the change in the metadata item of the encryption metadata to determine whether there is a locally cached copy of the at least one affected data item currently in the private cache of at least one of the plurality of data processing devices, and when there is the locally cached copy of the at least one affected data item to cause the locally cached copy to be brought into the system cache.

Clause 11. A method of memory protection comprising:

receiving a data item from a system cache via a system cache interface;

encrypting the data item in dependence on encryption metadata to produce an encrypted data item;

passing the encrypted data item via a memory system interface to a memory system;

receiving the encrypted data item received via the memory system interface;

decrypting the encrypted data item in dependence on the encryption metadata to produce a decrypted data item for provision via the system cache interface;

responding to a change in a metadata item of the encryption metadata by:

determining at least one affected data item which has been encrypted using the metadata item;

determining whether there is a cached copy of the at least one affected data item currently in the system cache; and when there is not the cached copy of at least one affected data item currently in the system cache to cause an encrypted version of the at least one affected data item to be retrieved from the memory system, to be decrypted using the metadata item in pre-change form, to be encrypted using the metadata item in post-change form, and to be returned to the memory system, and when there is the cached copy of the at least one affected data item currently in the system cache, in dependence on update control data, to cause the at least one affected data item to be retrieved from the system cache, to be encrypted using the metadata item in post-change form, and to be written out to the memory system.

In brief overall summary, apparatuses and methods for memory protection are disclosed. A memory protection apparatus is interposed between a system cache and a memory system. The apparatus comprises encryption circuitry, which encrypts data item in dependence on encryption metadata and decrypts encrypted data items in dependence on the encryption metadata. In response to a change in a metadata item of the encryption metadata, when no cached copy of an affected data item is currently in the system cache, the affected data item is retrieved from the memory system, re-encrypted using the updated metadata item and returned to the memory system. When there is a cached copy, in dependence on update control data, the copy is retrieved from the system cache, encrypted using the updated metadata item and written out to the memory system.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus for memory protection comprising:
a system cache interface configured to couple the apparatus to a system cache;
a memory system interface configured to couple the apparatus to a memory system;
encryption circuitry configured to encrypt a data item received via the system cache interface in dependence on encryption metadata to produce an encrypted data item for passing via the memory system interface to the memory system and configured to decrypt an encrypted data item received via the memory system interface in dependence on the encryption metadata to produce a decrypted data item for provision via the system cache interface; and
update control circuitry responsive to a change in a metadata item of the encryption metadata to:
determine at least one affected data item which has been encrypted using the metadata item and which is affected by the change in the metadata item;
determine whether there is a cached copy of the at least one affected data item currently in the system cache; and
when there is not the cached copy of the at least one affected data item currently in the system cache,
to cause an encrypted version of the at least one affected data item to be retrieved from the memory system,
to trigger the encryption circuitry to perform an encryption-metadata-change-triggered decryption of the encrypted version of the at least one affected data item using the metadata item in pre-change form to produce a decrypted version of the at least one affected data item,
to trigger the encryption circuitry to perform an encryption of the decrypted version of the at least one affected data item using the metadata item in post-change form, and to cause the at least one affected data item encrypted using the metadata item in post-change form to be returned to the memory system, and when there is the cached copy of the at least one affected data item currently in the system cache,
to cause said encryption-metadata-change-triggered decryption to be omitted, to cause the at least one affected data item to be retrieved from the system cache, to be encrypted using the metadata item in post-change form, and to be written out to the memory system.

2. The apparatus as claimed in claim 1, wherein the encryption circuitry comprises counter circuitry configured to maintain at least one count value, wherein the encryption metadata comprises the at least one count value, and wherein the encryption circuitry is configured to encrypt the data item received via the system cache interface in dependence on the at least one count value and to decrypt the received encrypted data item received via the memory system interface in dependence on the at least one count value,
and wherein the change in the metadata item of the encryption metadata comprises an incrementing of the at least one count value by the counter circuitry.

3. The apparatus as claimed in claim 1, further comprising data integrity checking circuitry configured to generate an integrity value for the data item received via the system cache interface and to cause the integrity value to be stored in association with the encrypted data item in the memory system,
and configured to regenerate the integrity value in dependence on the received encrypted data item and to compare the regenerated integrity value with the integrity value stored in association with the encrypted data item to verify the integrity of the received encrypted data item.

4. A data processing system comprising:
a plurality of data processing devices, wherein at least one of the plurality of data processing devices is provided with a private cache;
the apparatus for memory protection as claimed in claim 1;
the system cache;
and the memory system,
wherein the update control circuitry is responsive to the change in the metadata item of the encryption metadata to determine whether there is a locally cached copy of the at least one affected data item currently in the private cache of at least one of the plurality of data processing devices,
and when there is the locally cached copy of the at least one affected data item, to cause the locally cached copy to be brought into the system cache.

5. A method of memory protection comprising:
receiving a data item from a system cache via a system cache interface;
encrypting the data item in dependence on encryption metadata to produce an encrypted data item;
passing the encrypted data item via a memory system interface to a memory system;
receiving the encrypted data item via the memory system interface;
decrypting the encrypted data item in dependence on the encryption metadata to produce a decrypted data item for provision via the system cache interface;
responding to a change in a metadata item of the encryption metadata by:
determining at least one affected data item which has been encrypted using the metadata item and which is affected by the change in the metadata item;

determining whether there is a cached copy of the at least one affected data item currently in the system cache;

and when there is not the cached copy of the at least one affected data item currently in the system cache, causing an encrypted version of the at least one affected data item to be retrieved from the memory system, triggering an encryption-metadata-change-triggered decryption of the encrypted version of the at least one affected data item using the metadata item in pre-change form to produce a decrypted version of the at least one affected data item, triggering the encryption circuitry to perform an encryption of the decrypted version of the at least one affected data item using the metadata item in post-change form, and causing the at least one affected data item encrypted using the metadata item in post-change form to be returned to the memory system, and when there is the cached copy of the at least one affected data item currently in the system cache, causing said encryption-metadata-change-triggered decryption to be omitted, and causing the at least one affected data item to be retrieved from the system cache, to be encrypted using the metadata item in post-change form, and to be written out to the memory system.

6. The apparatus as claimed in claim 1, wherein the update control circuitry is responsive to the change in the metadata item of the encryption metadata to: when there is the cached copy of the at least one affected data item currently in the system cache, in dependence on update control data, to cause the at least one affected data item to be retrieved from the system cache, to be encrypted using the metadata item in post-change form, and to be written out to the memory system.

7. The apparatus as claimed in claim 6, wherein the update control circuitry is responsive to the change in the metadata item of the encryption metadata, when there is the cached copy of the at least one affected data item currently in the system cache, when the update control data has a first value, to cause the cached copy of the at least one affected data item to be retrieved from the system cache, to be encrypted using the metadata item in post-change form, and to be written out to the memory system, and when the update control data has a second value, to cause the cached copy of the at least one affected data item to be marked as modified in the system cache.

8. The apparatus as claimed in claim 7, wherein the update control circuitry is configured to maintain the update control data in a dynamic manner, wherein the update control data takes the first value or the second value in dependence on at least one dynamic factor when the apparatus is in operation.

9. The apparatus as claimed in claim 8, wherein the at least one dynamic factor comprises an indication of a master device accessing the at least one affected data item.

10. The apparatus as claimed in claim 8, wherein the at least one dynamic factor comprises a category of data to which the at least one affected data item has been assigned.

11. The apparatus as claimed in claim 8, wherein the at least one dynamic factor comprises a data access pattern indicator, wherein the data access pattern indicator has been empirically determined from previous data access patterns.

12. The apparatus as claimed in claim 7, wherein the update control data is set to cause the at least one affected data item to be retrieved from the system cache, to be encrypted using the metadata item in post-change form, and to be written out to the memory system.

* * * * *